(12) United States Patent
Sun et al.

(10) Patent No.: US 9,007,441 B2
(45) Date of Patent: Apr. 14, 2015

(54) METHOD OF DEPTH-BASED IMAGING USING AN AUTOMATIC TRILATERAL FILTER FOR 3D STEREO IMAGERS

(75) Inventors: Yajie Sun, Mountain View, CA (US); David R. Pope, Fremont, CA (US); Elaine Wenying Jin, Fremont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 508 days.

(21) Appl. No.: 13/362,323

(22) Filed: Jan. 31, 2012

(65) Prior Publication Data

US 2013/0033582 A1    Feb. 7, 2013

Related U.S. Application Data

(60) Provisional application No. 61/515,069, filed on Aug. 4, 2011.

(51) Int. Cl.
| | |
|---|---|
| *H04N 13/02* | (2006.01) |
| *G06K 9/46* | (2006.01) |
| *H04N 13/00* | (2006.01) |
| *G06T 5/00* | (2006.01) |
| *G06T 5/20* | (2006.01) |

(52) U.S. Cl.
CPC ....... *H04N 13/0018* (2013.01); *H04N 13/0239* (2013.01); *H04N 13/0271* (2013.01); *G06T 5/002* (2013.01); *G06T 5/20* (2013.01); *G06T 2200/04* (2013.01); *G06T 2200/21* (2013.01); *G06T 2207/10012* (2013.01); *G06T 2207/10028* (2013.01); *G06T 2207/20028* (2013.01)

(58) Field of Classification Search
CPC .. H04N 13/0239; G06T 7/0081; G06T 5/001; G06T 19/00; G06T 17/00; G06T 15/10; G06T 15/00

USPC ............................................. 348/47; 382/195
See application file for complete search history.

(56) References Cited

U.S. PATENT DOCUMENTS

| | | | |
|---|---|---|---|
| 8,629,868 B1 * | 1/2014 | Gardiner et al. | 345/419 |
| 2011/0080464 A1 | 4/2011 | Alessandrini | |
| 2011/0123183 A1 | 5/2011 | Adelsberger | |
| 2011/0128282 A1 | 6/2011 | Wang | |
| 2011/0148868 A1 | 6/2011 | Chang | |
| 2011/0169921 A1 * | 7/2011 | Lee et al. | 348/46 |
| 2012/0189208 A1 * | 7/2012 | Inaba et al. | 382/195 |
| 2012/0200669 A1 * | 8/2012 | Lai et al. | 348/43 |

OTHER PUBLICATIONS

Lu, Yue, "Multidimensional Directional Filter Banks and Surfacelets", Image Processing, IEEE Transactions (Apr. 2007), 1-14.

(Continued)

*Primary Examiner* — Dave Czekaj
*Assistant Examiner* — Tsion B Owens
(74) *Attorney, Agent, or Firm* — Michael H. Lyons (57) ABSTRACT

A system of stereo imagers, including image processing units and methods of blurring an image, is presented. The image is received from an image sensor. For each pixel of the image, a depth filter component is determined based on a focal area of the image and a depth map associated with the image. For each pixel of the image, a trilateral filter is generated that includes a spatial filter component, a range filter component and the depth filter component. The respective trilateral filter is applied to corresponding pixels of the image to blur the image outside of the focal area. A refocus area or position may be determined by imaging geometry or may be selected manually via a user interface.

20 Claims, 9 Drawing Sheets

(56) References Cited

OTHER PUBLICATIONS

Malassiotis, S., "A Face and Gesture Recognition System Based on an Active Stereo Sensor", Image Processing, International Conference (Oct. 7-10, 2001), 955-958.

Vaudrey, Tobi, "Fast Trilateral Filtering", Multimedia Imaging Report 40 (2009), 8 pgs.

Wong, Wilbur C.K., "Trilateral Filtering for Biomedical Images", Biomedical Imaging: Nano to Macro 2004, IEEE International Symposium (Apr. 15-18, 2004), 820-823.

* cited by examiner

METHOD OF DEPTH-BASED IMAGING USING AN AUTOMATIC TRILATERAL FILTER FOR 3D STEREO IMAGERS

CROSS-REFERENCE TO RELATED APPLICATIONS

This application claims priority of U.S. Provisional Patent Application Ser. No. 61/515,069, filed Aug. 4, 2011, which is incorporated herein by reference.

FIELD OF THE INVENTION

The present invention relates to depth-based imaging and, more particularly, to trilateral filters including a depth filter component to control the appearance of the depth of field.

BACKGROUND OF THE INVENTION

Shallow focus techniques are typically used by photographers to create images in which a portion of the scene is in focus and a remainder of the scene is out of focus. For example, shallow focus techniques may bring an object in the scene into sharp focus and the more distant background out of focus. This is sometimes referred to as the bokeh effect.

To create the bokeh effect, a main object to be highlighted is positioned within the depth of field while the background is positioned out of the depth of field. The depth of field depends on a number of factors, including the aperture size and the focal length of the camera. In general, the larger the aperture of the camera, the shallower the depth of field.

Shallow depth of field may be achieved with professional cameras, such as digital single-lens reflex (DSLR) cameras. Less expensive cameras (such as cellphone cameras and small point and shoot cameras) typically have small lens apertures that cannot achieve a shallow depth of field, and may not be capable of creating the same artistic defocus effect that may be achieved with professional DSLR cameras.

DETAILED DESCRIPTION

Figure 1:
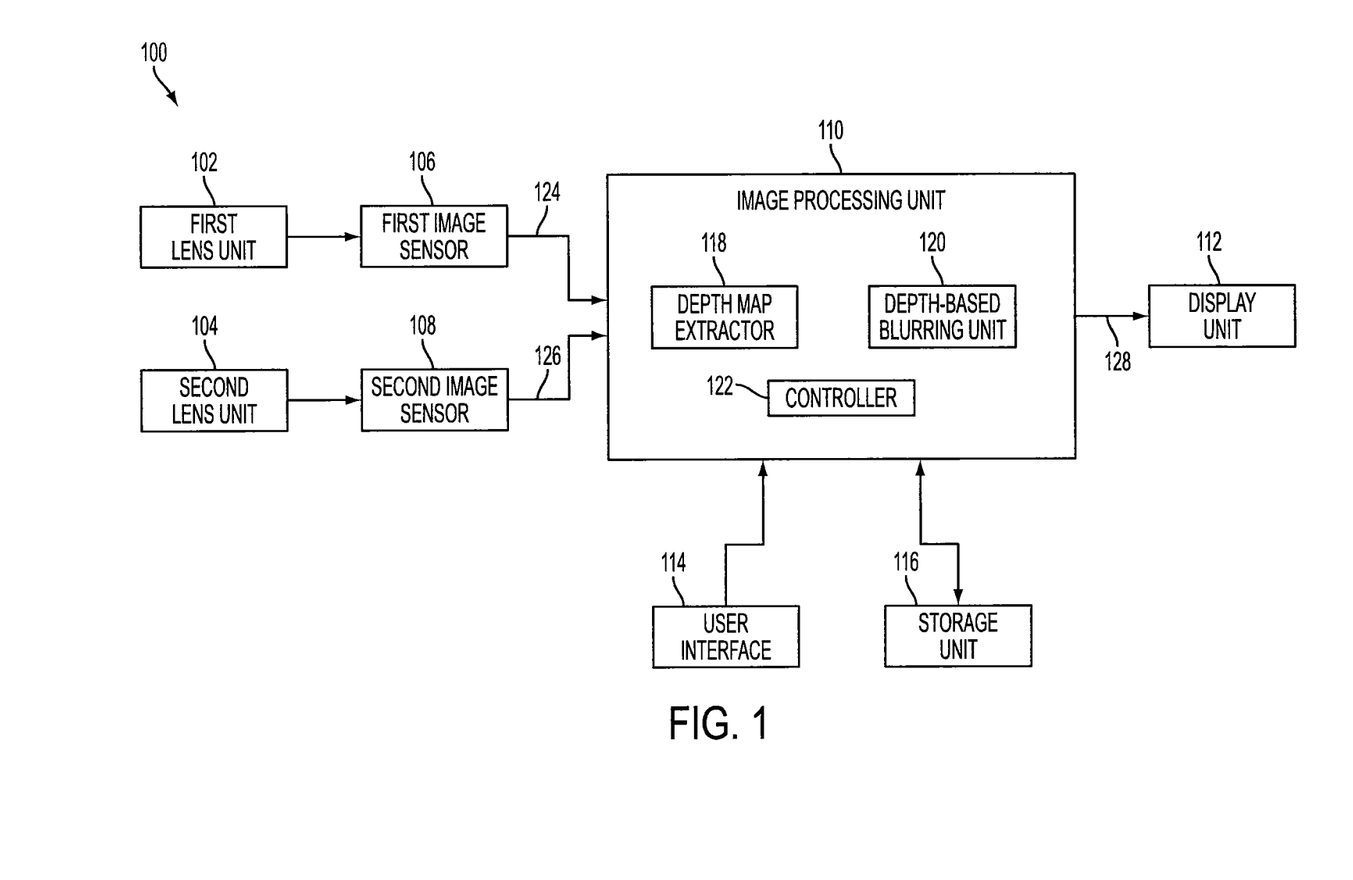
FIG. 1 is a block diagram illustrating a stereo imager with depth-based blurring according to an example embodiment of the present invention.

FIG. 1 is a block diagram of an example stereo imager, designated generally as 100. Stereo imager 100 includes first and second lens units 102, 104, first and second image sensors (or left and right image sensors) 106, 108, image processing unit 110 and display unit 112. Stereo imager 100 may also include user interface 114 and storage unit 116.

First and second lens units 102, 104 may gather light from an object and form images on respective regions of first image sensor 106 and second image sensor 108. As described further below with respect to FIG. 9, first and second image sensors 106, 108 may perform photoelectric conversion of light from respective first and second lens units 102, 104 into electric signals corresponding to first and second images 124, 126.

Image processing unit 110 may process the first and second images 124, 126 input from respective first and second image sensors 106, 108 to produce output image 128, which may be displayed on display unit 112. As described further below, image processing unit 110 may extract a depth map from first and second images 124, 126 and may control blurring of output image 128 provided to display unit 112.

Image processing unit 110 includes depth map extractor 118, depth-based blurring unit 120 and controller 122. As described further below with respect to FIG. 2, depth map extractor 118 may extract a depth map from first and second images 124, 126. Depth-based blurring unit 120, as described further with respect to FIG. 2, may determine a focal area of first image 124 (also referred to herein as input image 124), and may use the focal area and the depth map (from depth map extractor 118) to construct a depth filter component for each pixel in input image 124. Although first image 124 is described above as being the input image, it is understood that second image 126 may also be selected as the input image.

Depth-based blurring unit 120 may also create a trilateral filter including the depth filter component, as well as spatial and range filter components. The trilateral filter may be applied to input image 124 to produce output image 128 having a depth-based blur. The depth-based blur may blur output image 128 outside of the focal area, to create a defocused effect (i.e., a bokeh effect) similar to conventional large aperture lens cameras.

Image processing unit 110 may use software or dedicated hardware to generate output image 128 with depth-based blur. Controller 122 can control depth map extractor 118 and depth-based blurring unit 120 for generating output image 128. Controller 122 may also receive information, for example, from user interface 114, first image sensor 106, second image sensor 108, first lens unit 102 and/or second lens unit 104, to adjust one or more settings of depth map extractor 118 and/or depth-based blurring unit 120. In addition, controller 122 may perform at least some of the functions of one or more of depth map extractor 118 and depth-based blurring unit 120.

Display unit 112 may include any suitable display capable of displaying output image 128. Display unit 112 may also display input image 124, for example, to select the focal area of input image 124 and/or to refocus the selected focal area and defocus the rest of the scene.

User interface 114 may be used to control operation of stereo imager 100 in accordance with a user command. User interface 114 may be used, for example, to select the focal area of input image 124 and/or to refocus the scene to the selected focal area.

Storage unit 116 may be used to store first and second images 124, 126, the depth map, the trilateral filter for each pixel and output image 128. Storage unit 116 may be an internal memory or an external memory on a remote device. Storage unit 116 may be a non-volatile memory, a hard disc, a flash memory, etc.

Figure 9:
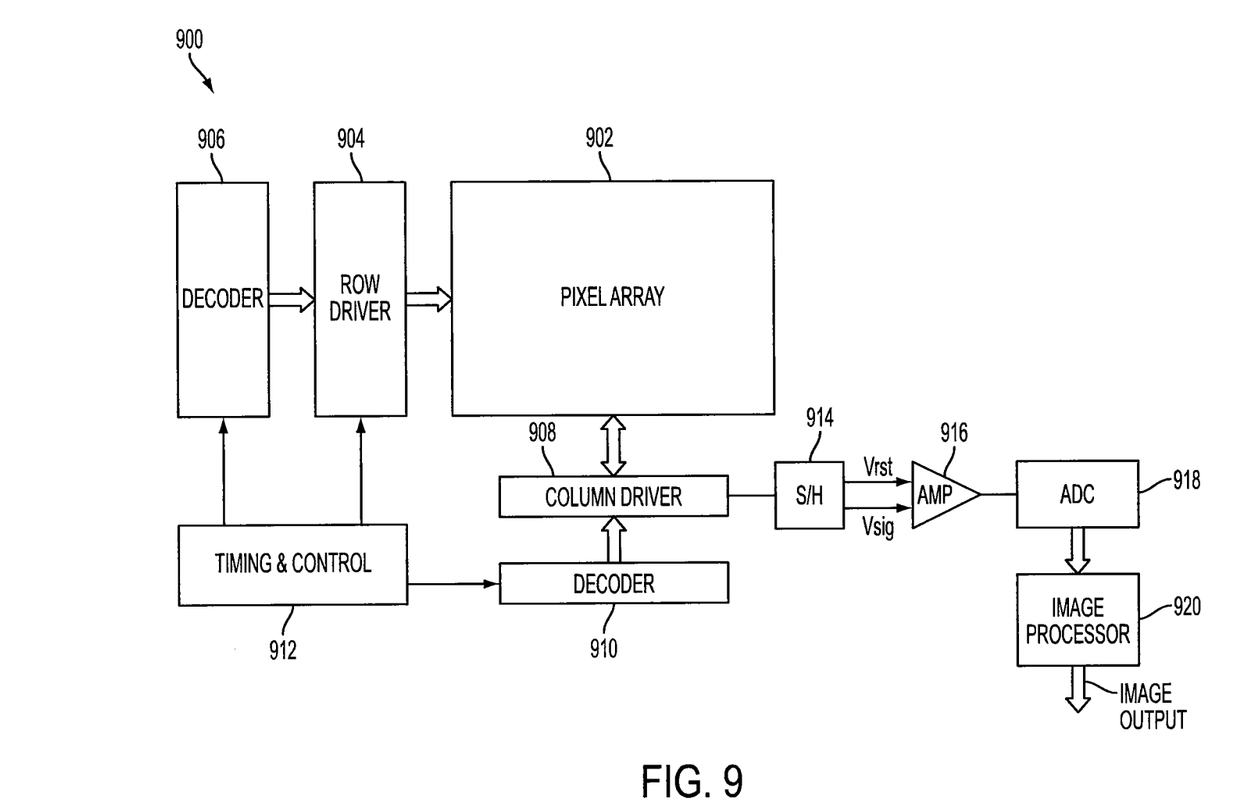
FIG. 9 is a block diagram of an image device in accordance with an example embodiment of the present invention.

In an example embodiment, image processing unit 110 may use a two-dimensional (2D) red-green-blue (RGB) image (i.e., captured from a pixel array, such as pixel array 902 of FIG. 9, having red, blue and green pixels) and an associated depth map (for example, extracted from depth map extractor 118) to generate a three dimensional (3D) stereo image. The depth map may be used for analysis of input image 124 and for controlling depth-based applications, such as depth-based blur (or artificial bokeh) and depth-based gesture recognition. A depth-based blur may be determined (for example, from depth-based blurring unit 120) using the depth map, to control the appearance of the depth of field. By controlling the appearance of the depth of field, output image 128 may be blurred according to the depth, creating a bokeh-like effect. Depth-based blurring unit 120 may use adaptive trilateral filters to incorporate depth information for depth-based blurring of output image 128 outside of the focal area. The depth filter component of the trilateral filter may be controlled by the depth information and may be adaptive to each pixel of input image 124.

Figure 2:
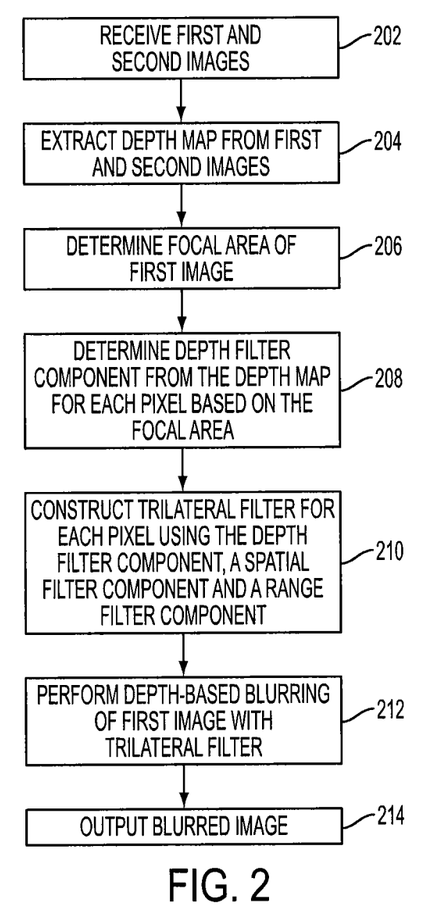
FIG. 2 is a flow chart illustrating a method for blurring an image according to an example embodiment of the present invention.

Referring to FIG. 2, a flow chart for blurring an image using depth information is shown. The steps illustrated in FIG. 2 represent an example embodiment of the present invention. It is understood that certain steps may be performed in an order different from what is shown. It is also understood that certain steps may be eliminated.

At step 202, first and second images are received, for example, first and second images 124, 126 (FIG. 1) may be received by image processing unit 110. At step 204, a depth map may be extracted from the first and second images, for example, by depth map extractor 118 (FIG. 1). According to an example embodiment, a stereo matching method may be used to extract the depth map, such as graph cut algorithms or belief propagation algorithms. A stereo matching method may, for example, calculate a depth value by detecting the locations of corresponding points in different images (such as first and second images 124, 126 shown in FIG. 1) and determine an amount of movement of the corresponding points in the images. Additional post-processing on the depth map may be performed after stereo matching, for example, by depth map extractor 118 (FIG. 1), to correct any errors in the depth map. It is understood that embodiments of the present invention are not limited to stereo imagers with two image sensors. For example, a stereo imager may include an image sensor and a depth map generated from the structured light, time of flight (ToF) technology, or any other method of generating a depth map.

In general, a depth map is an image where each pixel value represents a color (for example a shade of gray) that is characteristic of a distance of an object to the image sensor (such as first image sensor 106). A depth (Z) at a pixel position (sometimes also referred to as a distance of the object to the imaging lens along the image sensor Z axis) may be represented as:

$$Z = f\frac{B}{d} \quad (1)$$

where f represents a focal length of the image sensor (such as first image sensor 106 (FIG. 1), B represents a baseline separation between first image sensor 106 and second image sensor 108 and d represents a disparity (i.e., a pixel position difference) of the corresponding pixels in the first and second images 124, 126. As shown in eq. (1), the depth Z is proportional to 1/d (i.e., the inverse of disparity).

The extracted depth map and first image 124 (FIG. 1) may then be used as inputs into depth-based blurring unit 120 (FIG. 1) to obtain background defocused images, for example, to mimic a bokeh-like effect. At step 206, a focal area of first image 124 (FIG. 1) is determined.

For example, the focal area may be determined from first lens unit 102 (FIG. 1), based on the imaging geometry of first lens unit 102. This is described further below with respect to FIG. 5. As another example, an indication representing the focal area may be received, for example, via user interface 114 (FIG. 1). According to an example embodiment, a user may click on an image area of image 128 (FIG. 1) displayed by display unit 112 to select a refocus position, in order to determine the focus area. Accordingly, the focal area (and the blur area) may be adjusted based on a user selected focal position or may be automatically adjusted based on the imaging geometry.

At step 208, a depth filter component of a trilateral filter may be determined, for each pixel, from the depth map (step 204) based on the focal area (step 206). In general, the kernel size for the depth filter component may be adaptive according to the depth map (i.e., proportional to disparity or diopter).

At step 210, a trilateral filter may be constructed for each pixel using the depth filter component (step 208), a spatial filter component and a range filter component, for example, by depth-based blurring unit 120 (FIG. 1).

As discussed above, depth maps may include some errors and are typically post-processed. Even with an accurate depth map, a pure depth-based blurring may not yield appealing results, for example, such as a blur across an edge. An example trilateral filter of the present invention extends a bilateral filter with an additional component, a depth function component.

A conventional bilateral filter is typically an edge-preserving smoothing filter. The weighted smoothing value is not only controlled by the Euclidean spatial distance but also by the range of pixel intensities to preserve edges. A typical conventional bilateral filter (BF) may be represented as:

$$BF = G(\text{space}) * G(\text{range}) \quad (2)$$

where G(•) represents a filter function, space represents a spatial region of the input image and range represents a range of pixel intensities.

According to an example embodiment, a depth-based trilateral filter (TF) may be represented as:

$$TF = G(\text{space}) * G(\text{range}) * G(\text{depth}) \quad (3)$$

where in addition to spatial and range filter components, a depth filter component is also included. An example depth-based trilateral filter may be represented as:

$$TF_p = \frac{1}{W_p} \sum_{q \in S} G_{\sigma_s}(\|p - q\|) G_{\sigma_r}(|I_p - I_q|) G_{\sigma_d}(|Z_p - Z_q|) \quad (4)$$

where p represents the current pixel position, S represents the defined neighborhood of current pixel position p, and q represents a pixel position within neighborhood S. $I_p$ and $I_q$ are the pixel intensity values at pixel positions p and q. $Z_p$, $Z_q$ are depth values at pixel positions p and q. The term $\sigma_s$ represents the space control parameter, $\sigma_r$ is the range control parameter and $\sigma_d$ represents the depth control parameter (also referred to herein as the kernel size). The variable $W_p$ represents a normalization factor to ensure unity. In eq. (3), the depth filter component (G(depth)) may be used to control the kernel formation and size for blurring (outside of the focal area) or sharpening (inside the focal area).

Figure 3A:
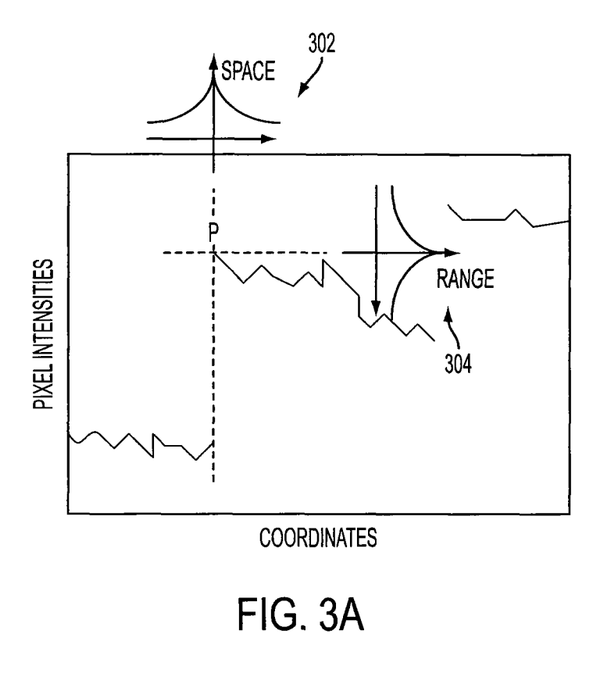
FIG. 3A is graph of pixel intensities as a function of pixel coordinates for an example input image according to an embodiment of the present invention.
Figure 3B:
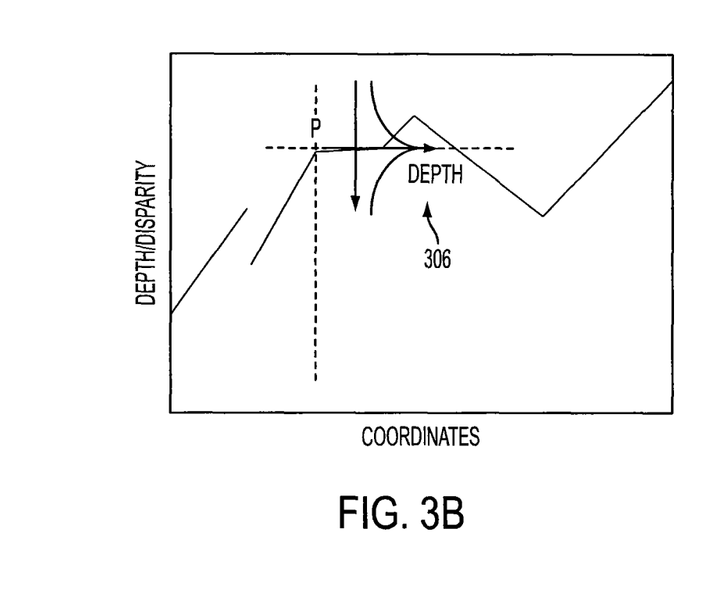
FIG. 3B is a graph of depth/disparity as a function of pixel coordinates for an example depth map associated with the input image of FIG. 3A according to an embodiment of the present invention.

Referring to FIGS. 3A and 3B, blurring control relative to a current pixel p with an example trilateral filter is illustrated. In particular, FIG. 3A is a graph of pixel intensities as a function of pixel coordinates of an example input image; and FIG. 3B is a graph of depth/disparity as a function of pixel coordinates for an example depth map of the input image. FIG. 3A also illustrates the construction of spatial filter component 302 and range filter component 304 of an example trilateral filter (with respect to current pixel p) on the input image. FIG. 3B illustrates the construction of depth filter component 306 of an example trilateral filter (with respect to current pixel p) on the corresponding depth map.

When performing blurring at current pixel position p, only pixels within a certain space (i.e., neighborhood S) (controlled by spatial filter component 302), which are close in pixel intensity range (controlled by the range filter component 304), and similar in depth (controlled by depth filter component 306, so that blur will not occur across a different depth of field) are used for the weighted output $TF_p$ (eq. (4)). As shown in eq. (4), the absolute value of depth (Z) may be used to control the depth filter component G(depth). By using the absolute value of depth (Z), the trilateral filter $TF_p$ may produce more blur with an increase in depth, which may be performed by setting $\sigma_d$ (a depth control parameter) as a function of depth.

Figure 4:
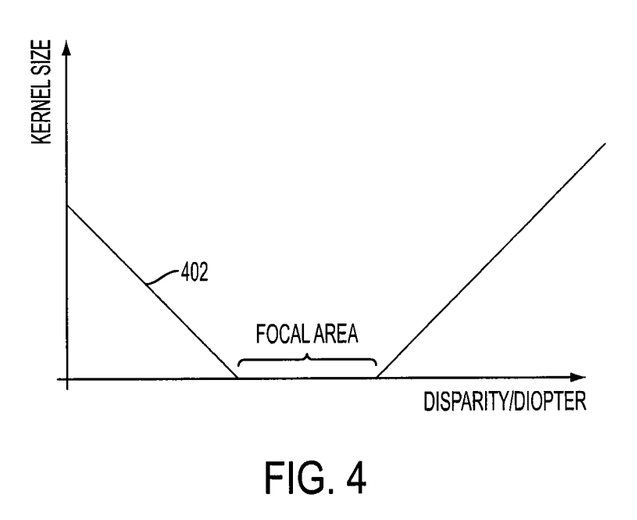
FIG. 4 is a graph of kernel size as a function of disparity/diopter illustrating control of a depth filter component according to an example embodiment of the present invention.

In an example embodiment, the trilateral filter structure shown in Eq. (4) may include a different filter function for at least one of the spatial, range and depth filter components. For example, a Gaussian function may be used for the depth filter component and range filter component, while a box filter may be used for the spatial filter component. Kernel sizes of the spatial and range filter components are controlled by control parameters and may be adaptive to different scenes. Kernel sizes of the depth filter component for pixels within the image are adaptive and dynamically determined by the refocus position and depth values as shown in FIG. 4.

In an example embodiment, each filter component (i.e., G(space), G(range), G(depth)) may be equally weighted, or at least one of the filter components may have a different weight. For example, one of the filter components may have a higher weight than the remaining filter components. For example, in the far field of depth, the depth filter component G(depth) may have a highest weight (i.e., may be the dominant component) so that it blurs broadly to produce a good bokeh effect.

Referring back to FIG. 2, at step 212, depth-based blurring is performed of the first image with the trilateral filter (step 210), for example, by depth-based blurring unit 120 (FIG. 1) on first image 124. At step 214, a blurred image may be output, for example, as output image 128 (FIG. 1) by display unit 112.

In step 212, the trilateral filter may apply a low-pass spatial filter to blur the first image outside of the focal area to create a defocus effect without blurring the focal area. The trilateral filter may be represented as:

$$TF_p = \begin{cases} \delta(\|p - q\|)\delta(|I_p - I_q|)\delta(|Z_p - Z_q|), & |Z_p - Z_f| < \Delta \\ \frac{1}{W_p} \sum_{q \in S} G_{\sigma_s}(\|p - q\|) G_{\sigma_r}(|I_p - I_q|) G_{\sigma_d}(|Z_p - Z_q|), & \text{otherwise} \end{cases} \quad (5)$$

where $\delta(\bullet)$ represents a Dirac delta function, $Z_f$ represents the focal area center and $\Delta$ represents a focal area range.

In general, the depth filter component G(depth) may be controlled by the depth information (i.e., from the depth map). The kernel size of the depth filter component is proportional to diopter, which is the inverse of the distance or depth, and the direction of the depth change. Because disparity is proportional to the inverse of the distance or depth, the diopter is linearly proportional to the disparity of the stereo matching used to extract the depth map (step 204). Accordingly, as shown in FIG. 4, the kernel size ($\sigma_d$) may be proportional to the disparity outside of the focal area, indicated by piecewise linear function 402. Within the focal area, no blurring is applied (as shown in eq. (5)), so that the kernel size is a minimum value, for example, 1, meaning the current pixel only.

Figure 5:
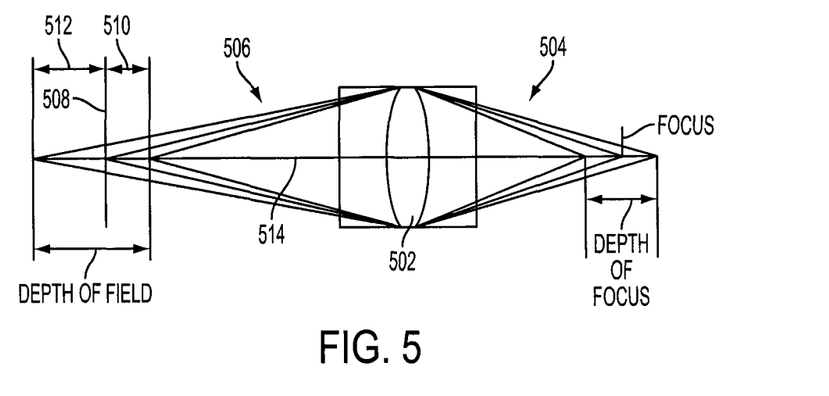
FIG. 5 is a cross-sectional view diagram of a lens illustrating imaging formation at a focal plane according to an example embodiment of the present invention.

FIG. 5 is a block diagram of lens 502 illustrating imaging formation with respect to focal plane 508. Lens 502 may be part of first or second lens units 102, 104 (FIG. 1). Lens 502 is illustrated with respect to the depth of field and the depth of focus relative to optical axis 514. The depth of field is the extent of a region around focal plane 508 (i.e., first region 510 in front of focal plane 508 and second region 512 behind focal plane 508) in which an object in a scene appears to be in acceptable sharp focus in an image. The depth of focus is a range of distance along optical axis 514 in which an image will appear in focus. As shown in FIG. 5, rays 504 from an object (not shown) in a depth of field are directed to lens 502. Rays 506 passed through lens 502 are converged towards the image plane.

The depth of field may be determined, for example, from a distance between the image sensor (such as image sensors 106, 108 (FIG. 1)) and the object, a focal length of lens 502, an f-number of lens 502, or a format size (i.e., a shape/size of the image sensor). The depth of focus may be determined, for example, from the f-number of lens 502, a circle of confusion (i.e., an optical spot caused by rays 506 from lens 502 not coming to a perfect focus when imaging a point source), an image distance, the focal length of lens 502 or a magnification factor. Factors for the depth of field and the depth of focus may be generally referred to as the imaging geometry.

According to an example embodiment, the focal plane depth $Z_f$ may be automatically determined from the imaging geometry. For example, an automatic control of blur may be set according to a piecewise linear function (such as piecewise linear function 402 shown in FIG. 4) to control the kernel size or depth parameter after determining the control point of $Z_f$. Referring to FIG. 4, the slope of the kernel size (i.e., of piecewise linear function 402) may be tied to aperture size or f-number. Accordingly, the degree of blur may be controlled according to the aperture size. Thus, details beyond focal plane 508 with depth greater than $Z_f$ may be blurred and details within depth $Z_f$ may be sharpened (for example, using a spatial peaking filter function) and maintained.

Referring back to FIG. 5, according to another example embodiment, a particular depth may be manually set, such that details within this depth are kept and sharpened, and details in front of and beyond this depth are blurred. According to an example embodiment, a user may indicate an image area (such as via user interface 114 (FIG. 1)) to select a refocus position. Image processing unit 110 (FIG. 1) may use the selected refocus position to automatically adjust the focal area and blur area. This manual technique may provide a usage scenario similar to conventional light field cameras.

Figure 6:
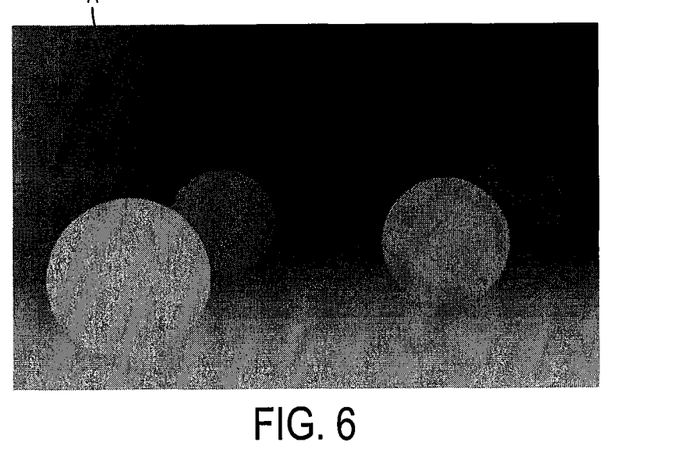
FIG. 6 is an example depth map obtained from an input image according to an example embodiment of the present invention.

FIG. 6 is an image of an example depth map. A focal depth may be selected at different portions of the depth map. For example, a focal depth may be selected as the second ball in the left row, illustrated by arrow A. If this focal depth is selected, then the selected ball will be sharpened, whereas the remaining balls will be blurred.

Figure 7A:
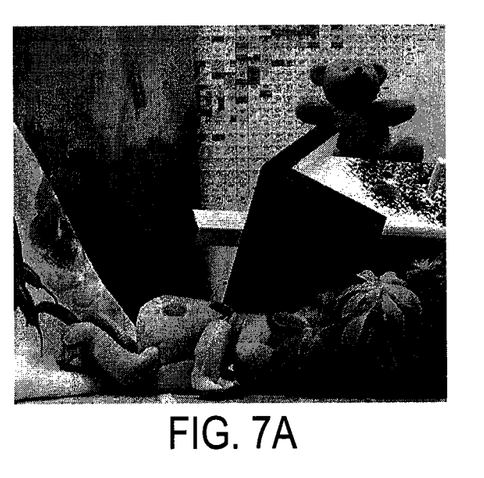
FIG. 7A is an example input image according to an embodiment of the present invention.
Figure 7B:
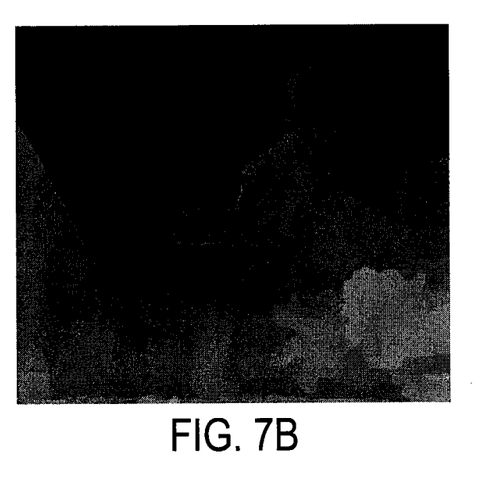
FIG. 7B is a depth map of the input image shown in FIG. 7A according to an example embodiment of the present invention.
Figure 8A:
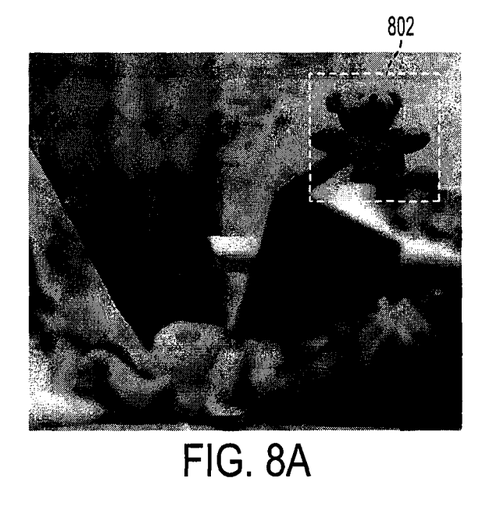
FIGS. 8A and 8B are blurred images of the input image shown in FIG. 7A illustrating selective focus of different objects according to an example embodiment of the present invention.
Figure 8B:
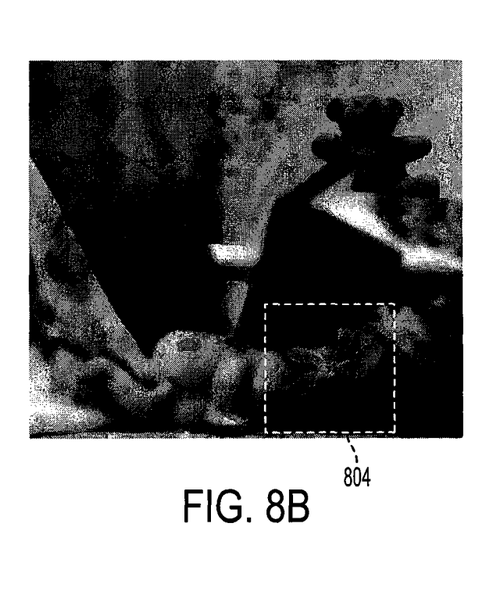

Referring next to FIG. 7A-8B, an example of providing depth-based blur using a trilateral filter according to an example embodiment of the present invention is shown. In particular, FIG. 7A is an example input image; FIG. 7B is an image of an example depth map associated with FIG. 7A; FIG. 8A is an output image having region 802 in focus; and FIG. 8B is an output image having region 804 in focus. In FIG. 7A, the input image is a left (or first) image obtained from a 3D stereo imager.

FIGS. 8A and 8B illustrate example results of depth-based blur when different objects are in focus. Because the depth or object selected as the focal area may be controlled, the trilateral filter may be adjusted accordingly, to obtain refocused images. The degree of blur may be changed by varying the slope of piecewise linear function 402 shown in FIG. 4.

Referring to FIG. 1, image processing unit 110 provides depth-based processing that combines two dimensional space and range filters into a three dimensional filter (by the inclusion of a depth filter component). Depth, edges and intensities of the input image and an associated depth map may coherently control the depth-based blur and sharpening. By identifying a focal field depth, sharpening and blur kernel controls may be set for different depths. In an example embodiment, a different filter component G(depth) may be substituted for other applications, such as tone, lightness control. Example trilateral filters may be used for other applications, such as depth-based scene blending or 3D object segmentation.

FIG. 9 is a block diagram of a CMOS image device 900 including pixel array 902. Image device 900 may represent first image sensor 106 (FIG. 1) or second image sensor 108. Pixel array 902 of image device 900 includes a plurality of pixels arranged in a predetermined number of columns and rows. The pixels of each row in the array are turned on by a row select line and the pixels of each column may be selected for output by a column select line. A column driver 908 and column address decoder 910 are also included in image device 900. A plurality of row and column lines are provided for the entire array. Although a column select line is described, the column select line is optional. Pixel array 902 may include any imaging array in accordance with an embodiment of the invention.

The row lines are selectively activated by row driver 904 in response to row address decoder 906. CMOS image device 900 is operated by timing and control circuit 912, which controls address decoders 906, 910 for selecting the appropriate pixels for pixel readout, and row and column driver circuitry, which apply driving voltages to drive transistors of the selected pixels.

Each column of the array contains sample and hold circuitry (S/H), designated generally as 914, including sample and hold capacitors and switches associated with the column driver that read and store a pixel reset signal (Vrst) and a pixel image signal (Vsig) for selected pixels. A differential signal (reset-signal) is produced by programmable gain amplifier (PGA) circuit 916 for each pixel, which is digitized by analog-to-digital converter (ADC) 918. ADC 918 supplied the digital pixel signals to image processor 920, which forms and outputs a digital image.

Figure 10:
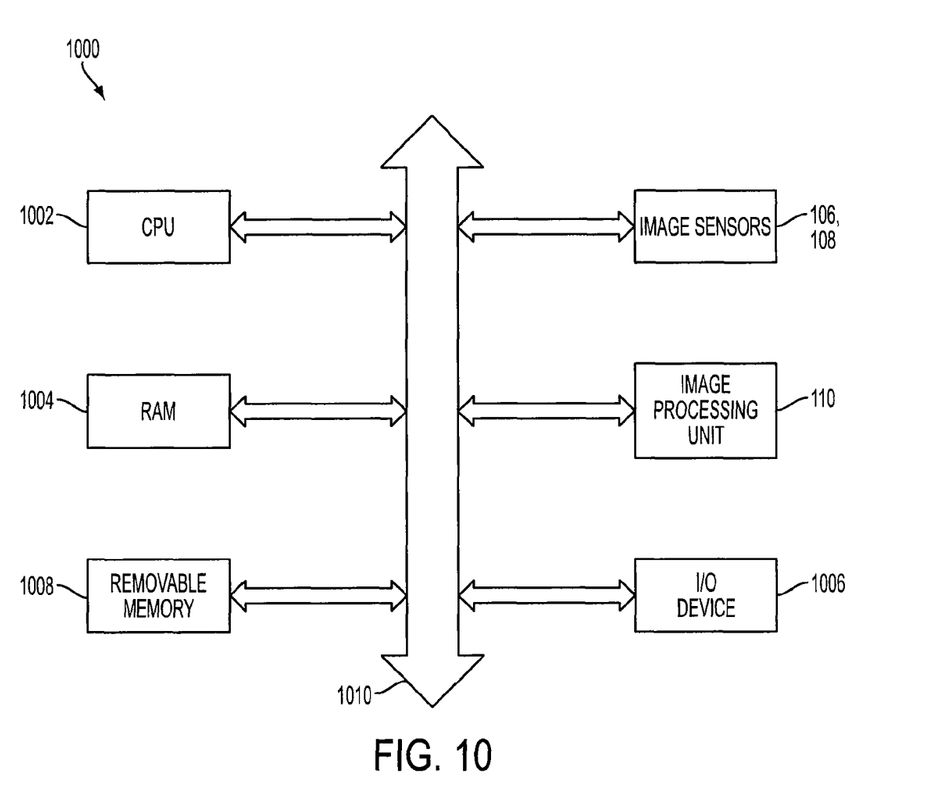
FIG. 10 is a block diagram of a processor system incorporating at least one imaging device constructed in accordance with an example embodiment of the present invention.

FIG. 10 shows a typical processor-based system, designated generally as 1000. The processor-based system 1000, as shown, includes central processing unit (CPU) 1002 which communicates with input/output (I/O) device 1006, first image sensor 106, second image sensor 108 and image processing unit 110 over bus 1010. The processor-based system 1000 also includes random access memory (RAM) 1004, and removable memory 1008, such as a flash memory. At least a part of CPU 1002, RAM 1004, first image sensor 106, second image sensor 108 and image processing unit 110 may be integrated on the same circuit chip.

Although the invention has been described in terms of systems and methods for depth-based blurring of an image, it is contemplated that one or more steps and/or components may be implemented in software for use with microprocessor/general purpose computers (not shown). In this embodiment, one or more of the functions of the various components and/or steps described above may be implemented in software that controls a computer. The software may be embodied in non-transitory tangible computer readable media for execution by the computer.

Although the invention is illustrated and described herein with reference to specific embodiments, the invention is not intended to be limited to the details shown. Rather, various modifications may be made in the details within the scope and range of equivalence of the claims and without departing from the invention.

What is claimed:

1. A method of blurring an image comprising:
   receiving the image from an image sensor;
   determining, for each pixel of the image, a depth filter component based on a focal area of the image and a depth map associated with the image;
   generating, for each pixel of the image, a trilateral filter including a spatial filter component, a range filter component and the depth filter component; and
   applying the respective trilateral filter to corresponding pixels of the image to blur the image outside of the focal area, wherein the trilateral filter for a current pixel position is based on a sum of the product of a plurality of different filter functions over a neighborhood of the current pixel position.

2. The method according to claim 1, wherein the applying of the respective trilateral filter sharpens pixels within the focal area.

3. The method according to claim 1, the method further including: determining the focal area based on an imaging geometry of the image sensor.

4. The method according to claim 1, the method further including: receiving a selection indicating the focal area from a user interface.

5. The method according to claim 1, wherein the image sensor includes first and second image sensors, the receiving of the image includes receiving first and second images from the respective first and second image sensors, the method further including:
extracting the depth map from the first and second images, one of the first and second images being selected as the image.

6. The method according to claim 1, wherein, for each pixel, the spatial filter component is determined based on a range of neighboring pixels relative to the pixel.

7. The method according to claim 1, wherein, for each pixel, the range filter component is determined based on pixel intensities of neighboring pixels relative to the pixel.

8. The method according to claim 1, wherein the generating of the trilateral filter includes applying a weight to each of the depth filter component, the spatial filter component and the range filter component.

9. The method according to claim 8, wherein the weight of at least one of the depth filter component, the spatial filter component and the range filter component is different.

10. The method according to claim 1, wherein a kernel size of the depth filter component includes a piecewise linear function having an absolute value of a slope relative to a disparity of the image that is greater than one outside of the focal area.

11. The method according to claim 10, wherein the determining of the depth filter component includes adjusting the slope of the kernel size to control a degree of blurring by the depth filter component.

12. The method according to claim 1, wherein the trilateral filter ($TF_p$), for a current pixel position p, is determined according to:

$$TF_p = \frac{1}{W_p} \sum_{q \in S} G_{\sigma_s}(\|p-q\|) G_{\sigma_r}(|I_p - I_q|) G_{\sigma_d}(|Z_p - Z_q|)$$

where G(.) is a filter function, S is a neighborhood of the current pixel position p, q is another pixel position within neighborhood S, I is a pixel intensity value, Z is a depth value, $W_p$ is a normalization factor, $\sigma_s$ is a space control parameter, $\sigma_r$ is a range control parameter and $\sigma_d$ is a depth control parameter.

13. The method according to claim 12, wherein the trilateral filter includes a Dirac delta function when the depth value $Z_p$ of the current pixel position p is within the focal area.

14. The method according to claim 12, wherein the trilateral filter includes a different filter function for at least one of the depth filter component, the spatial filter component or the range filter component.

15. An image processing unit for blurring an image comprising:
an input port configured to receive an image from an image sensor with a corresponding lens, wherein the image processing unit is configured to automatically determine a focal area from an imaging geometry of the lens; and
a blurring unit configured to:
generate, for each pixel of the image, a trilateral filter including a spatial filter component, a range filter component and a depth filter component, the depth filter component being determined based on the focal area of the image and a depth map associated with the image, and
apply the respective trilateral filter to corresponding pixels of the image to blur the image outside of the focal area.

16. The image processing unit according to claim 15, wherein the image sensor includes first and second image sensors, and the image includes first and second images from the respective first and second image sensors,
the image processing unit further including a depth map extractor configured to extract the depth map from the first and second images, one of the first and second images being used as the image by the blurring unit.

17. The image processing unit according to claim 15, wherein the blurring unit is configured to sharpen the image within the focal area.

18. The image processing unit according to claim 15, wherein the image processing unit is configured to receive a selection indicating the focal area.

19. The image processing unit according to claim 15, wherein the blurring unit is configured to control at least one of a weight or a filter function of each of the spatial filter component, the range filter component and the depth filter component.

20. The image processing unit according to claim 15, wherein:
a kernel size of the depth filter component includes a piecewise linear function having an absolute value of a slope relative to a disparity of the image that is greater than one outside of the focal area, and
the blurring unit is configured to adjust the slope of the kernel size to control a degree of blurring by the depth filter component.

* * * * *